(12) United States Patent
Ohara

(10) Patent No.: US 7,201,570 B2
(45) Date of Patent: Apr. 10, 2007

(54) TIRE MOLD

(75) Inventor: Masaaki Ohara, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 10 days.

(21) Appl. No.: 11/166,256

(22) Filed: Jun. 27, 2005

(65) Prior Publication Data

US 2006/0008547 A1 Jan. 12, 2006

(30) Foreign Application Priority Data

Jul. 6, 2004 (JP) .................... P2004-199626

(51) Int. Cl.
*B29C 35/02* (2006.01)

(52) U.S. Cl. ........................ 425/46; 425/812

(58) Field of Classification Search ................ 425/46, 425/812
See application file for complete search history.

(56) References Cited

U.S. PATENT DOCUMENTS

| | | | | |
|---|---|---|---|---|
| 5,120,209 A * | 6/1992 | MacMillan | ................... | 425/46 |
| 5,234,326 A * | 8/1993 | Galli et al. | ................... | 425/46 |
| 5,639,326 A * | 6/1997 | Soulalioux | ................... | 425/46 |
| 7,025,581 B2 * | 4/2006 | Kata | ........................... | 425/46 |

FOREIGN PATENT DOCUMENTS

JP 2002-361632 12/2002

* cited by examiner

*Primary Examiner*—James P. Mackey
(74) *Attorney, Agent, or Firm*—Hunton & Williams LLP

(57) ABSTRACT

It is a subject to restrict protrusion of rubber when performing molding and to mold tires of superior uniformity; and for this purpose, the tire mold in which a mold for molding a tire tread is comprised of segments partitioned in a tire circumferential direction is arranged in that segments 11, 12 comprise a plurality of pieces 21 to 25 and 31 to 35 partitioned in the tire circumferential direction, with only one 23, 33 of the pieces of the each segment 11, 12 being fixed while all other pieces 21, 22, 24, 25 and so on are movable in the tire circumferential direction.

4 Claims, 3 Drawing Sheets

TIRE MOLD

BACKGROUND OF THE INVENTION

1. Field of the Invention

The present invention relates to a tire mold in which parts for molding a tread are partitioned into a plurality of segments, and particularly to a technique of restricting protrusion of rubber into clearances between adjoining segments and of molding tires exhibiting superior uniformity.

2. Description of the Prior Art

In performing molding of pneumatic tires, sector partitioned mold in which parts for molding treads of tires are partitioned in a tire circumferential direction have been employed. The partitioned parts are called segments, and such segments are usually partitioned into 7 to 13 parts. When performing molding, each segment is moved inside in a radial direction toward a tire rotational axis whereupon the mold is closed for molding a tire. For instance, there is known a tire mold as disclosed in Japanese Patent Laid-Open Publication No. 2002-361632.

When performing molding, each segment moves in the tire radial direction. As illustrated in FIG. 1, when a segment 1a includes projecting streaks 2a, 2b for molding transverse grooves on a tread surface, the projecting streak 2a at a central portion of the segment 1a enters in a tire radial direction Ra from the surface of a green tire T for molding a transverse groove.

However, since the direction of the projecting steaks 2b at end portions of the segment 1a entering from the surface of the green tire T is identical to the direction Ra from which the projecting streak 2a enters, it is different from a direction Rb in which the projecting streaks 2b extend so that angular difference will be caused. As a result, the rubber of the green tire T will be pushed by the projecting streaks 2b from the central portion of the segment 1a towards the end portions. Similarly in the adjoining segment 1b, the projecting streaks 2d of the segment end portions will also enter from direction Rc, which is a direction different from an extending direction Rd thereof. As a result, the rubber of the green tire T will be pushed from the central portion of the segment 1b towards the end portions by the projecting streaks 2d.

Accordingly, the volume of a portion pinched between the projecting streaks 2b and 2d of the green tire T will be increased. The portion where the volume is locally increased through the movement of the rubber will be pinched between adjoining segments in the course of closing the mold so that protrusion of rubber, which is called 'flash', is caused whereby the quality of external appearance is degraded. Moreover, the movement of the rubber will lead to an uneven thickness of the tread part which might cause degradations in tire performances.

For preventing such deficiencies of manufacture, there had been employed a method of preliminarily molding green tires having a smaller radius than an inner radius of the mold cavity. In such a case, the outer radius of the tire became large through the molding so that a framework of tires was grown in size which would lead to degradations in tire durability.

SUMMARY OF THE INVENTION

It is an object of the present invention to restrict protrusion of rubber when performing molding and to mold a tire of superior uniformity.

For solving the above subject upon keen examinations, the present invention is a tire mold in which a mold for molding a tire tread is comprised of segments partitioned in a tire circumferential direction, the tire mold being arranged in that the segments comprise a plurality of pieces partitioned in the tire circumferential direction, wherein only one of the pieces of the each segment is fixed while all other pieces are movable in the tire circumferential direction.

The present invention is the tire mold, wherein the fixed pieces are pieces at a central portion of the each segment.

The present invention is the tire mold, wherein the fixed pieces are pieces at an end portion of the each segment.

The mold according to the present invention is arranged in that segments partitioned in the tire circumferential direction comprise a plurality of pieces that are partitioned in the tire circumferential direction, wherein only one piece of each segment is fixed while all other pieces are movable in the tire circumferential direction. Accordingly, while respective pieces are apart from each other in a condition in which the mold is open, pieces of adjoining segments abut each other in the course of reducing the inner radius of the mold cavity, and the mold is closed while narrowing the clearance between the pieces. All pieces including the pieces at end portions of the each segment substantially move in radial directions of the tire. As a result, even if the pieces comprise projecting streaks for forming grooves, no movements of the rubber caused through the projecting streaks as discussed above will occur so that it is possible to restrict protrusion of rubber when performing molding and to mold tires exhibiting superior uniformity.

Due to the fact that one piece of the each segment is fixed, the entire piece is prevented from rotating in the tire circumferential direction, and no shifts in molded tread patterns (design shifts) will be caused. While the piece to be fixed may be any piece located at any position of the each segment, it is desirable to define it to be a piece at a central portion of the each segment at which the distance of movement in the tire circumferential direction is small or a piece at an end portion of the each segment that exhibits dropout preventing effects.

Since clearances between the pieces that are formed until the mold is completely closed will function as vent holes, it will not be necessary to arrange vent holes at the mold so that it is possible to restrict occurrence of so-called bears.

The invention present is the tire mold, wherein the pieces of the each segment are coupled through repulsive means.

Since the pieces are coupled by repulsive means such as springs, the pieces are closed with the clearance gradually being narrowed. As a result, the clearance between pieces will not become zero prior to complete closure of the mold owing to unbalanced force acting on the pieces.

The present invention is the tire mold, wherein the clearance between the pieces in a condition in which the mold is open is 0.3 mm to 10 mm.

When the clearance between the pieces is less than 0.3 mm, the moving distance in the circumferential direction will be small, and it might happen that no effects of restricting movements of rubber can be achieved. When it exceeds 10 mm, the pieces will expand too widely in the circumferential direction so that they overlap with adjoining segments.

The tire of the present invention is a pneumatic tire molded by using the tire mold of the present invention.

As discussed above, the pneumatic tire molded by using the mold according to the present invention is free of protrusions of rubber and is superior in uniformity.

In the tire mold of the present invention, the mold is closed while the clearance between a plurality of pieces partitioned in the tire circumferential direction is narrowed, and the pieces substantially move in radial directions of the tire. As a result, no movement of rubber caused through projecting streaks formed at the pieces will occur so that it is possible to restrict protrusion of rubber when performing molding and to mold a tire of superior uniformity.

DESCRIPTION OF THE PREFERRED EMBODIMENTS

Figure 1:
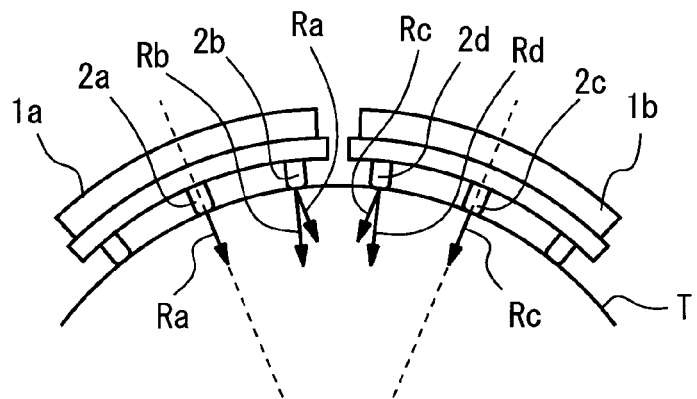
FIG. 1 is a view illustrating a tire mold according to the prior art.
Figure 2:
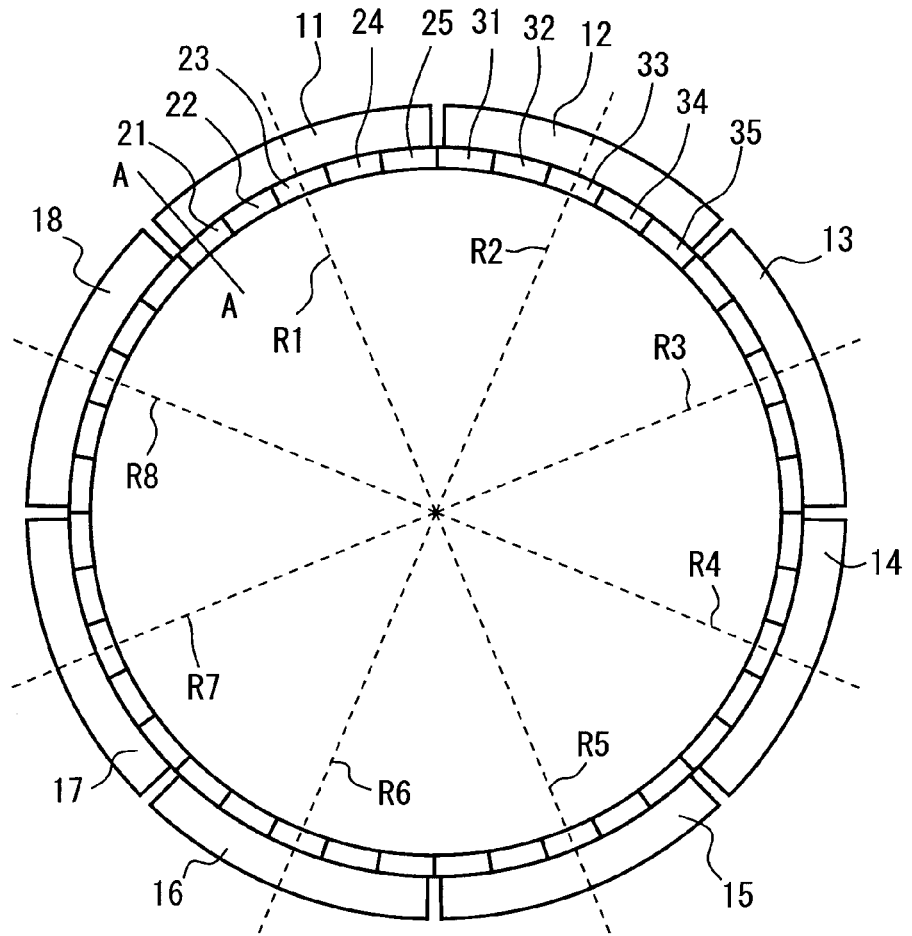
FIG. 2 is a view illustrating a condition in which the tire mold according to the present invention is closed.

An embodiment of a tire mold according to the present invention will now be explained on the basis of the drawings. FIG. 2 illustrates a condition in which the mold according to the present invention is closed. The mold for molding a tire tread is partitioned into eight segments 11 to 18, and is movable in a tire radial direction. For instance, the segment 11 is movable in a tire radial direction R1.

Each segment comprises a plurality of pieces further partitioned in a tire circumferential direction. For instance, the segment 11 comprises pieces 21 to 25, and the segment 12 comprises pieces 31 to 35. The piece 21 and others comprise projecting streaks (not shown) for forming grooves on a tread surface.

Figure 3:
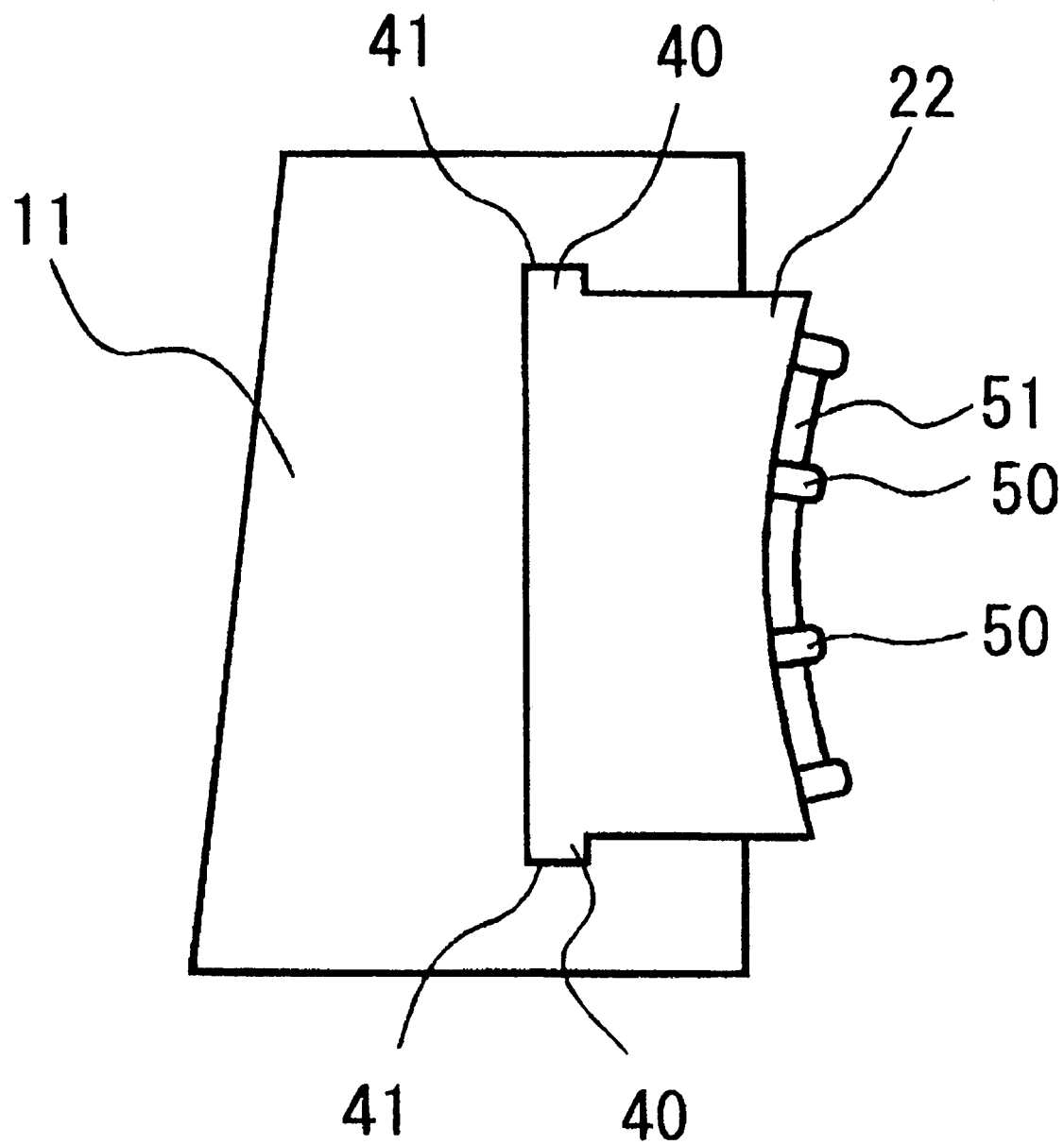
FIG. 3 is a view illustrating a section of the tire mold according to the present invention.

FIG. 3 is a sectional view along line A–A in FIG. 2. In the drawings, the piece 21 comprises a projection (or projecting streak) 40 and engages with a groove 41 engraved in the segment 11 along the tire circumferential direction. Accordingly, the piece 21 and others are slidable in the tire circumferential direction except for the pieces 23, 33 at central portions of the each segment 11, 12. The piece 21 and others comprise a projecting streak 50 for molding a circumferentially directed groove on the tread surface and a projecting streak 51 for molding a transverse groove.

Figure 4:
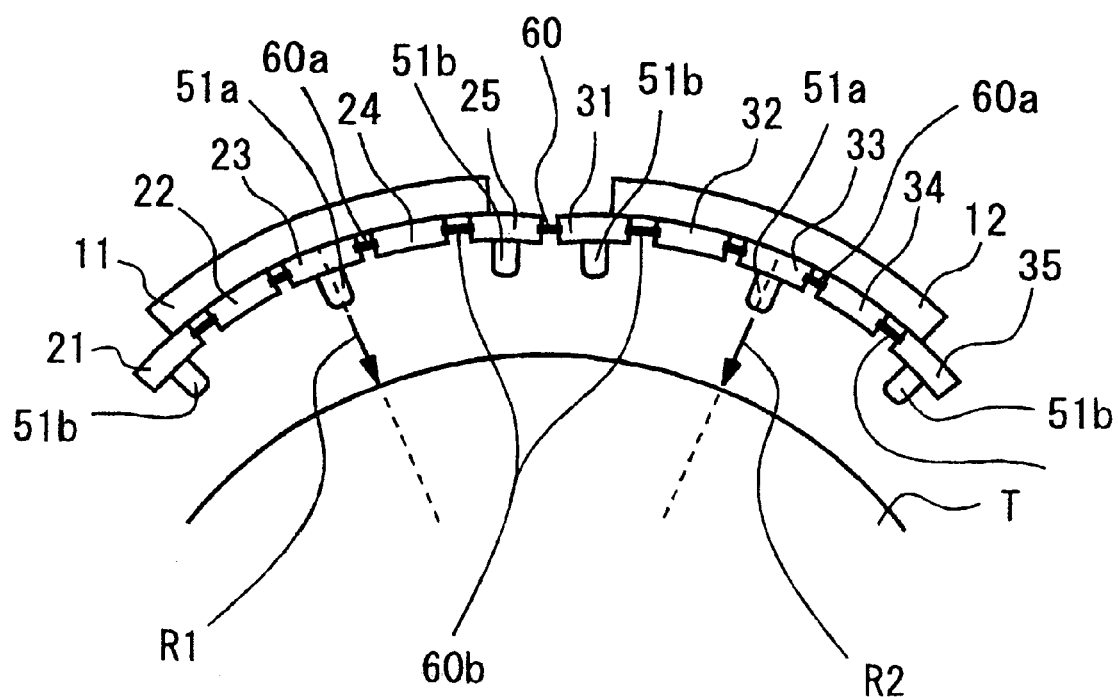
FIG. 4 is a view illustrating a condition in which the tire mold according to the present invention is open.

Operations of the mold when performing molding will now be explained. FIG. 4 is a view illustrating a condition in which the mold is open, wherein only segments 11 and 12 are illustrated. When performing tire molding, the segments 11, 12 move in directions R1, R2, which are radial directions of the tire, respectively, whereupon the diameter of the mold is reduced. Pieces 21, 23, 25, 31, 33, 35 at central portions and both end portions of the segments 11, 12 are provided with projecting streaks 51 for molding transverse grooves. The pieces 21 to 25 and 31 to 35 are coupled through springs 60a, 60b. In a condition in which the mold is open, the respective pieces are mounted to be apart from each other through repulsive force of the springs 60a, 60b. In this condition, the clearance between the pieces is preferably 0.3 mm to 10 mm.

Figure 5:
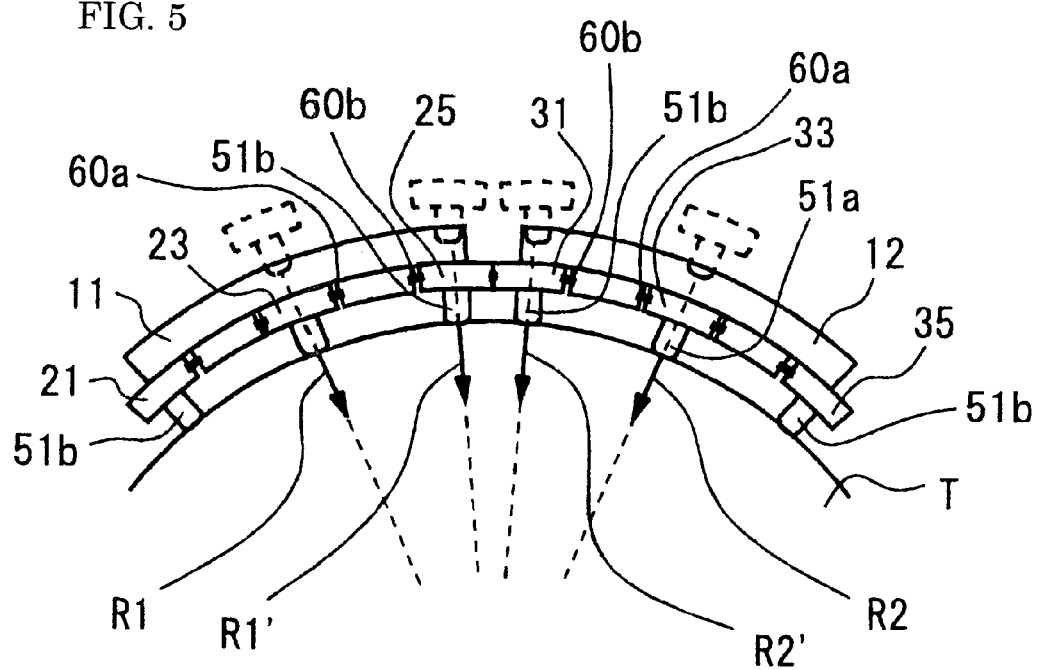
FIG. 5 is a view illustrating a condition in which the tire mold according to the present is approaching a tire.

As illustrated in FIG. 5, when the segments 11, 12 move in directions R1, R2, the pieces 23, 33 at the central portions of the segments are fixed so that they move in directions R1 and R2, respectively. The segments 11, 12 further move so that the projecting streaks 51a provided at the respective pieces will also enter into tire T in directions R1, R2. As a result, transverse grooves are molded on the tread surface.

Pieces 25 and 31 of adjoining segments abut against each other while moving towards the central portions of the respective segments. Accordingly, moving directions of the pieces 25, 31 differ from the directions R1, R2 and move in directions R1', R2'. R1' and R2' are substantially identical to depth directions of the transverse grooves that are molded by projecting streaks 51b that are provided at the pieces 25, 31. As a result, no movements of rubber will be caused even if the projecting streaks 51b enter the tire T. It is possible to prevent protrusion of rubber from between the piece 25 and the piece 31. Moreover, since uniformity of the tread portion is secured, the performance of the molded tire will not be degraded. In this respect, the spring 60 between the piece 25 and the piece 31 may either be or not be provided.

The same applies also to other pieces. For instance, even when providing the projecting streak 51 at the piece 24, the projecting streak 51 will substantially enter in the depth direction of the transverse groove to be molded so that no movements of rubber is caused.

Further, since the pieces 23, 33 at central portions of the each segment 11, 12 are fixed, the entire pieces are prevented from rotating in the tire circumferential direction. As a result, shifts in tread patterns to be molded (design shifts) can be prevented.

Since angular difference between pieces at both end portions of the segments will be larger, it is necessary to make the pieces move by a larger extend in the circumferential direction. For this purpose, while clearances between adjoining pieces may be provided at even intervals, it is preferable to set clearances between pieces that are remote from the central portions of the each segment to be larger. For instance, it is preferable to set the clearance between piece 24 and piece 25 to be larger than the clearance between piece 23 and piece 24. This can be realized by increasing a free length or by increasing a spring constant of the spring 60b between the pieces 24, 25 than that of the spring 60a between the pieces 23, 24.

In a condition in which the mold is completely closed, the pieces abut so that clearances between the pieces will finally become zero. Prior to that, the clearances serve as vent holes. It will accordingly be possible to omit the necessity of providing vent holes that had been formed in prior art segment mold. It is alternatively possible to employ an arrangement in which the pieces are further partitioned in a tire width direction that are coupled through bolts or similar such that minute clearances are formed. Those minute clearances will function as vent holes also in such a case.

When the pieces are formed to be of identical shapes, it is possible to reduce costs for manufacturing the mold. For this purpose, it is possible to uniformly partition the pieces with a flat plane extending in the tire width direction or to partition the same with a curved plane in accordance with tread patterns. It is also possible to make them to be of identical shapes in accordance with pitches of tread patterns.

What is claimed is:

1. A tire mold in which a mold for molding a tire tread is comprised of segments partitioned in a tire circumferential direction, the tire mold being arranged in that the segments comprise a plurality of pieces partitioned in the tire circumferential direction, wherein only the pieces at an end portion of each segment are fixed while all other pieces are movable in the tire circumferential direction.

2. A tire mold as claimed in claim 1, wherein the pieces of the each segment are coupled through repulsive means.

3. A tire mold as claimed in claim 1, wherein the clearance between the pieces in a condition in which the mold is open is 0.3 mm to 10 mm.

4. A tire mold as claimed in claim 2, wherein the clearance between the pieces in a condition in which the mold is open is 0.3 mm to 10 mm.

* * * * *